United States Patent Office 2,857,441
Patented Oct. 21, 1958

2,857,441
PREHNITENE MANUFACTURE BY DISPROPORTIONATION

David A. McCaulay, Chicago, Ill., assignor to Standard Oil Company, Chicago, Ill., a corporation of Indiana No Drawing. Application December 17, 1956
Serial No. 628,497

3 Claims. (Cl. 260—671)

This invention relates to the disproportionation of pseudocumene. Particularly this invention relates to an accelerated pseudocumene disproportionation process. More particularly the invention relates to the manufacture of prehnitene.

The various tetramethylbenzenes are now of commercial interest as starting materials for the production of methylbenzene carboxylic acids and also benzene tetracarboxylic acid. The tetramethylbenzenes can be prepared by the disproportionation of the various trimethylbenzenes. A disability to the disproportionation of trimethylbenzenes lies in the elevated temperatures needed or the prolonged times at lower temperatures.

Prehnitene (1,2,3,4-tetramethylbenzene) occurs in the natural equilibrium mixture of tetramethylbenzenes in amounts on the order of 5 mole percent. The presence of four methyl groups immediately adjacent each other is of considerable interest to chemical manufacturers. Exploitation of this material has been prevented by the very small amount of material available from natural sources, coupled with the cost of handling 9 or 10 volumes of undesired material for each volume of product prehnitene.

An object of the invention is the disproportionation of pseudocumene to tetramethylbenzenes. A particular object is a process for the disproportionation of pseudocumene at a greater rate than obtainable with prior art processes. Another object is the manufacture of prehnitene. A further particular object is the disproportionation of pseudocumene to produce a mixture of tetramethylbenzenes containing considerably more prehnitene than the equilibrium amount. Other objects will become apparent in the course of the detailed description.

The aromatic hydrocarbon feed to the process consists essentially of pseudocumene (1,2,4-trimethylbenzene) and secondary butyl-pseudocumene. It is extremely difficult to obtain pure pseudocumene. Very high purity material contains on the order of 5% of the other trimethylbenzene isomers and ethyltoluenes. Pseudocumene containing on the order of 5 mole percent of these other $C_9$ hydrocarbons is suitable for the process. While it is preferred to use a feed containing no non-aromatic hydrocarbons because of the side reactions which occur at the temperatures used with this catalyst pseudocumene containing the two or three percent of paraffinic hydrocarbons present in pseudocumene derived from petroleum sources is suitable for use in the process.

The other component of the liquid feed to the process is secondary butyl-pseudocumene. The secondary butyl-pseudocumene may be introduced into the reaction zone or premixed with the pseudocumene component, as such. Or the secondary butyl-pseudocumene may be prepared by alkylating pseudocumene with a normal butene i. e., butene-1 or butene-2. Only enough n-butene is charged to produce the desired liquid feed, i. e., mole ratio of pseudocumene to secondary butyl-pseudocumene of between about 1:1 and 4:1. The alkylation reaction may be carried out using any suitable alkylation catalyst. It is preferred to use as the alkylation catalyst substantially anhydrous hydrogen fluoride. By the use of the hydrogen fluoride catalyst it is possible to prepare the liquid feed in situ or transfer the mixture of liquid feed and catalyst to the disproportionation reaction zone without incurring a catalyst separation step.

It is to be noted that approximately the same reaction rate acceleration is obtainable by the use of isopropyl pseudocumene as the second component of the charge to the reaction zone. Isopropyl xylene which is a biproduct of the disproportionation reaction boils in the same range as the product tetramethylbenzenes and therefore a product recovery problem is introduced by the use of isopropyl pseudocumene. For this reason the instant process is limited to the use of secondary butyl-pseudocumene as the reaction accelerator.

The liquid feed to the process consisting essentially of pseudocumene and secondary butyl-pseudocumene is charged to the reaction zone or contacting zone in a mole ratio of pseudocumene to secondary butyl-pseudocumene of between about 1:1 and 4:1. In other words the liquid feed contains between about 20 mole percent and 50 mole percent of the secondary butyl-pseudocumene. In general when maximum disproportionation reaction rate increase is desired the liquid feed should contain about equal amounts of pseudocumene and secondary butyl-pseudocumene.

The catalyst utilized in the process is liquid hydrogen fluoride. The reaction is carried out under substantially anhydrous conditions; water in the system collects in the catalyst. In general the catalyst should not contain more than about 4–5% of water. It is preferred to operate under essentially anhydrous conditions with a catalyst containing on the order of 0.5% water. Commercial grade anhydrous hydrofluoric acid is suitable for use in the process.

The reaction is a liquid phase one and sufficient pressure is maintained on the system to keep the feed and the HF catalyst in the liquid state.

The amount of liquid HF used in the process is between about 25 volume percent and about 400 volume percent calculated with respect to the liquid feed charged to the contacting zone. In general, the liquid HF usage is between about 50 and 200 volume percent. Use of the larger amounts of catalyst has some beneficial effect on the disproportionation reaction rate. One hundred volume percent has been found to be an eminently suitable amount of liquid HF catalyst.

The disproportionation reaction rate is determined by a combination of temperature and time. The lower the temperature the longer the time needed to attain a particular degree of disproportionation. In the accelerated reaction rate process herein described two simultaneous reactions occur. Primarily there is the disproportionation of pseudocumene to produce tetramethylbenzenes. It appears that the tetramethylbenzenes produced from the pseudocumene are mostly durene and prehnitene; these then isomerize to produce isodurene. It is possible by controlling the time and temperature to produce a tetramethylbenzene product mixture which contains considerably more prehnitene than the equilibrium mixture; in fact the product mixture may contain 3 or more times the theoretical equilibrium of about 5 mole percent of prehnitene.

When it is desired to maximize the tetramethylbenzene product mixture yield the contacting is carried out at a temperature between about 40° C. and about 125° C.; at these temperatures the contacting is maintained for a time of about 15 minutes and about 300 minutes, the longer times corresponding to the lower temperatures. Thus at about 125° C. the contacting would be maintained for about 15 minutes. In general, it has been found that sufficiently good yields are obtainable by operations at temperatures about 80° and 110° C. At these temperatures the contacting time should be on the order of 60 minutes. At these temperatures deviations from the contacting time by as much as 15 minutes do not have a great effect on the tetramethylbenzene product yield.

When it is desired to produce prehnitene as the primary product the contacting is maintained at a temperature between about 40° C. and about 60° C. The contacting is maintained for maximum times at each particular temperature. At about 40° C. the maximum time is about 60 minutes and at about 60° C. the maximum time is about 15 minutes, i. e., the longer maximum times correspond to the lower temperatures. It has been found that at about 50° C. it is possible to operate for a time of about 60 minutes without substantial adverse effect on the prehnitene content of the tetramethylbenzene product mixture.

The tetramethylbenzenes can be readily separated into their individual components by a combination of distillation and fractional crystallization. Prehnitene may be separated by either distillation or fractionation. Durene is readily separated by crystallization. The boiling points and freezing points of the tetramethylbenzene are set out below:

|  | B. P., ° C. | F. P., ° C. |
|---|---|---|
| Durene | 196.9 | 79.1 |
| Isodurene | 198.2 | −23.8 |
| Prehnitene | 205.1 | −6.3 |

The results obtainable with the process of the instant invention are illustrated by working examples set out below. It is to be understood that these examples do not limit the invention.

In the runs the secondary butyl-pseudocumene was obtained by introducing butene-1 in the desired amount into the reactor after the pseudocumene had been introduced. In all cases the alkylation reaction was carried out at about 0° C.; the olefin was introduced at rate such that the temperature was substantially maintained at this low point. After the alkylation was complete the contents of the reactor namely, pseudocumene, secondary butyl-pseudocumene and catalyst were brought up to the desired disproportionation reaction temperature.

The individual runs were carried out in a 1 liter autoclave provided with a stirrer. The pseudocumene used was essentially pure material and contained only 1 or 2% of the other trimethylbenzenes. Commercial grade anhydrous hydrofluoric acid was used as the catalyst. Essentially pure butene-1 was used as the olefin for the production of secondary butyl-pseudocumene.

For purposes of comparison runs were made without any reaction rate accelerator present. In all runs after the reactor had been stirred for the predetermined time at the particular temperature contents were withdrawn into a polyethylene flask containing cold water; the whole being contained in a Dry Ice acetone bath. An upper layer of hydrocarbons was separated by decantation from a lower aqueous layer. The hydrocarbons were neutralized before being fractionated into close boiling fractions. The close boiling fractions were analyzed by infrared techniques to determine the compounds and isomers present. The results of the runs are set out in Table I.

Runs 5 and 6 were carried out at a disproportionation temperature of 5° C. for a total time of 18 hours. In these two runs no disproportionation product was produced in spite of the extreme time of contacting.

Runs 1 and 2 were carried out at 98° C. at a time of 60 minutes. Run No. 1 was carried out with pseudocumene alone. In run No. 1 the hydrocarbon product mixture contained 13% of tetramethylbenzenes. The tetramethylbenzenes were very close to the equilibrium concentration. Run No. 2 was carried out with approximately equal amounts of pseudocumene and secondary butyl-pseudocumene. The reaction product mixture contained more than twice the amount of tetramethylbenzene than was produced in run No. 1. The composition of the tetramethylbenzene product was the same in run No. 2 as in run No. 1.

Runs 3 and 4 were carried out at 50° C. and 60 minutes time. Run No. 3 was with pseudocumene alone and produced a product mixture containing 9% of tetramethylbenzenes. The tetramethylbenzene product contained the same distribution of isomers as did the material from run No. 1 at the higher temperature. Run No. 4 produced more than double the amount of tetramethylbenzene produced in run No. 3. In addition to this higher tetramethylbenzene product produced the composition of the tetramethylbenzene product is very markedly different than that of run 3. Whereas in run 3 only 10% of the tetramethylbenzene was prehnitene in run 4, 25% of the tetramethylbenzene product was prehnitene. Thus it is possible to obtain simultaneously an increased yield of tetramethylbenzene and also very very markedly increased amounts of prehnitene by use of the process of the instant invention.

Thus having described the invention what is claimed is:

1. A process for the manufacture of prehnitene which process comprises contacting, under substantially anhydrous conditions, a liquid feed consisting essentially of pseudocumene and secondary butyl-pseudocumene, in a mole ratio of pseudocumene to secondary butyl-pseudocumene of between about 1:1 and 4:1, in the presence of liquid hydrogen fluoride, in an amount of between about 25 and 400 volume percent, based on said feed, at a temperature between about 40° C. and about 60° C. for a maximum time of between about 15 minutes and about 60 minutes, the longer maximum times corresponding to the lower temperatures, separating a product hydrocar-

TABLE I

*HF:100 vol. percent on feed*

| Run No. | 1 | 2 | 3 | 4 | 5 | 6 |
|---|---|---|---|---|---|---|
| Charge, Moles: | | | | | | |
| Pseudocumene | 2.0 | 2.03 | 2.17 | 2.17 | 2.17 | 2.17 |
| Butene-1, moles | 0 | 1.01 | 0 | 1.0 | 1.0 | 0 |
| HF, moles | 25 | 25 | 25 | 25 | 25 | 25 |
| Alkylation Temp., ° C. | | 3 | | 3 | 3 | |
| Reaction Temp., ° C. | 98 | 98 | 50 | 50 | 5 | 5 |
| Reaction Time, Min. | 60 | 60 | 60 | 60 | 1,080 | 1,080 |
| Product Distribution, Mole Percent: | | | | | | |
| Xylene | 13 | 10 | 8 | 5 | 0 | 0 |
| Trimethylbenzene | 74 | 36 | 83 | 47 | 52 | 100 |
| Tetramethylbenzene | 13 | 28 | 9 | 20 | 0 | 0 |
| Sec-Butylxylene | | 12 | | 13 | 0 | 0 |
| Sec-Butyltrimethylbenzenes and higher | | 13 | | 15 | 48 | 0 |
| Composition of Tetramethylbenzenes, Percent: | | | | | | |
| Durene | 45 | 45 | 45 | 50 | | |
| Isodurene | 45 | 45 | 45 | 25 | | |
| Prehnitene | 10 | 10 | 10 | 25 | | | bon mixture from said HF, separating a product tetramethylbenzene mixture from said hydrocarbon mixture and separating prehnitene from said tetramethylbenzene product mixture, which tetramethylbenzene product mixture is characterized by a prehnitene content considerably greater than 10 mole percent.

2. The process of claim 1 wherein said feed is obtained by alkylating pseudocumene with n-butene using liquid HF catalyst and charging the alkylation product and catalyst to said contacting step.

3. The process of claim 1 wherein said mole ratio is about 1:1, said temperature is on the order of 50° C. and said time is about 60 minutes.

References Cited in the file of this patent

UNITED STATES PATENTS

| | | |
|---|---|---|
| 2,803,681 | McCaulay | Aug. 20, 1957 |
| 2,814,651 | McCaulay | Nov. 26, 1957 |

OTHER REFERENCES

Nightingale: Chemical Reviews, vol. 25, 1939, pp. 329–376 (pages 341 and 344 only relied on).